United States Patent Office 3,308,154
Patented Mar. 7, 1967

3,308,154
PHENYL N-ALKYLCARBAMYLOXY-
BENZHYDRYL KETONES
Edward L. Schumann, Portage Township, Kalamazoo
County, Mich., assignor to The Upjohn Company,
Kalamazoo, Mich., a corporation of Delaware
No Drawing. Filed Dec. 27, 1963, Ser. No. 334,044
5 Claims. (Cl. 260—479)

This invention relates to new and useful chemical compounds and more particularly to phenyl carbamyloxy-benzhydryl ketones (hydroxyphenyl-desoxybenzoin carbamates) which are useful as hypocholesteremic agents.

The novel compounds of the present invention and the process of their production are illustratively represented by the following sequence of structural formulas:

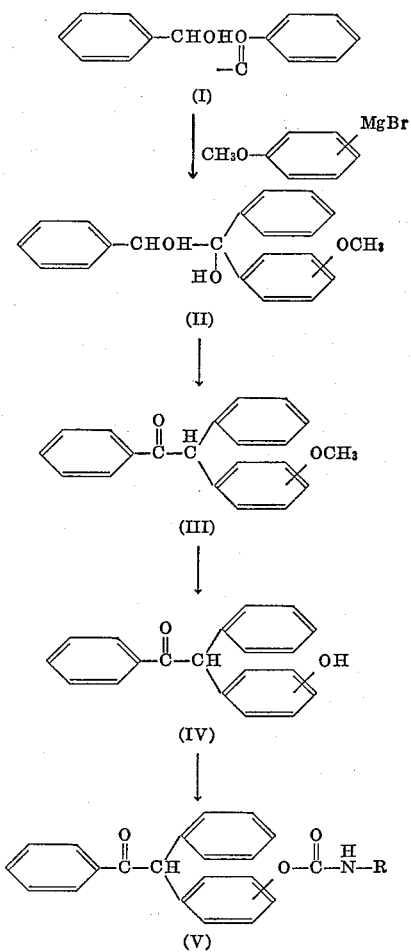

wherein R is a lower-alkyl radical having from 1 to 6 carbon atoms, inclusive.

Representative for radical R are the groups: methyl, ethyl, propyl, isopropyl, butyl, isobutyl, pentyl, isopentyl, hexyl, 2,2-dimethylbutyl, 2,3-dimethylbutyl, 3-methylpentyl and the like.

The compounds of Formula V, lower-alkylcarbamates of hydroxyphenyl-desoxybenzoin, have significant hypocholesteremic activity. The compounds are thus useful in the treatment of atherosclerosis, a form of arteriosclerosis characterized by the fatty degeneration occurring in the arterial walls, by mechanisms not yet definitely established. It has been observed, however, that hypercholesteremia is a common finding in human subjects with atherosclerosis. Hypercholesteremia refers essentially to an excess of cholesterol in the blood serum. While the causes of hypercholesteremia and the nature of its role in atherosclerosis and related conditions is not clearly understood, considerable effort has been directed toward reducing blood and tissue cholesterol levels as an attack upon the clinical conditions in which high levels are implicated. It has long been recognized that certain substances such as sitosterol, corn oil, and nicotinic acid are capable of reducing in small degree the blood and tissue cholesterol contents, either by interfering with the absorption of exogenous cholesterol introduced with food, or by facilitating the excretion of cholesterol from the body. Major emphasis, however, has been placed on the search for compounds which will interfere with the production of endogenous cholesterol by the liver and hence offer a more positive means of control of cholesterol levels.

The novel compounds of the present invention significantly reduce the cholesterol content of both blood and tissue by partially arresting the biosynthesis of cholesterol in the body.

Compositions containing the active compounds of Formula V, e.g., phenyl 4-N-methylcarbamyloxybenzhydryl ketone, can be administered in various oral formulations in unit dosage form, each unit containing a predetermined amount of the active compound. Formulations in the form of tablets, pills, capsules, feed granules, elixirs, suspensions, syrups and the like are used for oral administration.

These formulations are useful to decrease the level of blood cholesterol in mammals and birds.

The starting materials of Formula IV are prepared by reacting benzoin (I) with an anisyl magnesium halide to give the corresponding 1,2-diphenyl-1-anisylethylene glycol of Formula II; subjecting this glycol to the action of iodine in acetic acid to obtain by rearrangement an α-anisyl-desoxybenzoin of Formula III, which is cleaved with hydrogen halide, preferably hydrogen bromide or hydrogen iodide, to give the corresponding α-hydroxyphenyl-desoxybenzoin of Formula IV. Details of these reactions are shown in the preparations.

In carrying out the process of the present invention, the selected phenyl hydroxybenzhydryl ketone (α-hydroxyphenyldesoxybenzoin, IV) is reacted in an inert organic solvent with a selected alkyl isocyanate. Inert solvents used in the reaction can be benzene, toluene, pyridine, diethyl ether, diisopropyl ether, dioxane, tetrahydrofuran or the like. In the preferred embodiment of the invention the desoxybenzoin of Formula IV and the alkyl isocyanate are preferably mixed in equimolar ratio or the alkyl isocyanate is used in slight excess (10 to 50%) above equimolecular proportion. Larger ratios or smaller ratios of starting materials and alkyl isocyanate are operative, but do not provide any advantages. The reaction proceeds at temperatures between about 15 and 125° C. and can be accelerated by adding a small amount of a base such as triethylamine or using a slightly basic solvent such as pyridine. The time of the reaction is between several hours and one week or more. At room temperature (about 25° C.), usually from 12 hours to 5 days is required for completion of this reaction. The product is recovered by conventional means, such as precipitation and filtration or concentration of the reaction mixture. The product is purified by conventional means such as recrystallization.

PREPARATION 1

α-(4-hydroxyphenyl)-desoxybenzoin (phenyl 4-hydroxybenzhydryl ketone)

A Grignard solution was prepared from 187 g. (1 mole) of 4-bromoanisole and 24 g. (1 mole) of magnesium turnings in 2 l. of anhydrous ether. To this solution, under continuous stirring, was added 70.6 g. (0.333 mole) of benzoin in 1.1 liters of anhydrous tetrahydrofuran. The addition was accomplished over a period of 1.5 hours. The solution was thereupon heated under reflux for 1 hour and then poured over a mixture of 4 l. of crushed ice and 214 g. of ammonium chloride. The major amount of product which precipitated as a solid was collected by filtration. The organic layer of the filtrate was separated and evaporated to obtain additional product. The combined crude product thus obtained was recrystallized from 95% ethanol to give 51.7 g. (48%) of pure white 1,2-diphenyl-1-p-anisylethylene glycol of melting point 205–207° C.

Analysis.—Calcd. for $C_{21}H_{20}O_3$: C, 78.72; H, 6.29. Found: C, 78.74; H, 6.28.

A solution of 0.1 g. of iodine in 50 ml. of glacial acetic acid was mixed with 6.4 g. (0.02 mole) of 1,2-diphenyl-1-p-anisylethylene glycol, heated to boiling for 5 minutes, then cooled and poured into 250 ml. of water. The mixture was extracted with three 100-ml. portions of chloroform, the combined chloroform extracts were washed with water, then sodium bisulfite solution, then 10% aqueous sodium hydroxide, and finally with water. The extracts were thereupon dried over anhydrous sodium sulfate and evaporated to give a residue which was recrystallized from benzene-Skellysolve B hexanes to give 4.3 g. of a white product, α-(p-anisyl)-desoxybenzoin, melting at 87–89° C. A small amount of 1.7 g. of less pure α-(p-anisyl)-desoxybenzoin (phenyl 4-methoxybenzhydryl ketone) melting at 81–84° C. was also obtained. Total yield was 6 g., corresponding to 100%.

The α-(p-anisyl)-desoxybenzoin had the following analysis:

Analysis.—Calcd. for $C_{21}H_{18}O_2$: C, 83.41; H, 6.00. Found: C, 83.50; H, 5.84.

A mixture of 3 g. of α-(p-anisyl)-desoxybenzoin, 25 ml. of 48% hydrobromic acid, and 30 ml. of acetic acid was heated under reflux for 4 hours. Thereafter, the mixture was cooled, poured into 200 ml. of cold water and extracted with two 100-ml. portions of chloroform. The combined chloroform extracts were shaken with 100 ml. of 10% aqueous sodium hydroxide and the precipitated sodium salt of α-(4-hydroxyphenyl)-desoxybenzoin was separated by filtration and washed well with ether.

The above sodium salt was suspended in 100 ml. of chloroform and shaken with 100 ml. of 10% aqueous hydrogen chloride until all solid was dissolved. The chloroform layer was then separated, washed with water and evaporated to give a residue which was twice recrystallized from a benzene-pentane mixture to give 2.1 g. (73%) of α-(4-hydroxyphenyl)-desoxybenzoin of melting point 130–132° C. and having an analysis as follows:

Analysis.—Calcd. for $C_{20}H_{16}O_2$: C, 83.31; H, 5.59. Found: C, 83.47; H, 5.73.

PREPARATION 2

α-(2-hydroxyphenyl)-desoxybenzoin (phenyl 2-hydroxybenzhydryl ketone)

In the manner given in Preparation 1, benzoin was added slowly to a Grignard solution prepared from 2-bromoanisole and magnesium turnings in ether. After the reaction was terminated the solution was poured into crushed ice and ammonium chloride, this mixture filtered and the ether layer evaporated and recrystallized from ethanol to give 1,2-diphenyl-1-o-anisylethylene glycol.

As in Preparation 1, the 1,2-diphenyl-1-o-anisylethylene glycol was heated for 5 minutes in a solution of glacial acetic acid containing iodine. The reaction mixture was then cooled and poured into water, which was extracted with chloroform, the chloroform extracts were washed with sodium bisulfite, sodium hydroxide and water, and finally evaporated to give α-(o-anisyl)-desoxybenzoin.

The thus-obtained α-(o-anisyl)-desoxybenzoin was treated with 48% aqueous hydrogen bromide and acetic acid at reflux temperature. The material was cooled, poured into water and extracted with chloroform, the chloroform extracts were washed and worked up as in Preparation 1 to give α-(2-hydroxyphenyl)-desoxybenzoin (phenyl 2-hydroxybenzhydryl ketone).

PREPARATION 3

α-(3-hydroxyphenyl)-desoxybenzoin (phenyl 3-hydroxybenzhydryl ketone)

In the manner given in Preparation 2, benzoin was added to a Grignard solution prepared from 3-bromoanisole and magnesium turnings. After work up, as in Preparation 2, 1,2-diphenyl-1-m-anisylethylene glycol was obtained. This material was subjected to treatment with acetic acid and iodine to give α-(m-anisyl)-desoxybenzoin. The α-(m-anisyl)-desoxybenzoin thus obtained was treated in acetic acid solution with 48% hydrogen bromide at the boiling point to give α-(3-hydroxyphenyl)-desoxybenzoin (phenyl 3-hydroxybenzhydryl ketone).

EXAMPLE 1

Phenyl 4-N-methylcarbamyloxybenzhydryl ketone

A mixture of 15 g. (0.052 mole) of phenyl 4-hydroxybenzhydryl ketone, 250 ml. of toluene, 3 g. (0.052 mole) of methyl isocyanate and 2 drops of triethylamine was heated under reflux for 4 hours. The material was then refrigerated overnight. Thereafter, the solution (no precipitate appeared) was concentrated under reduced pressure and the resulting gummy material was recrystallized twice from chloroform-Skellysolve B hexanes, then twice from methanol to give 4.4 g. (25%) of white, solid phenyl 4-N-methylcarbamyloxybenzhydryl ketone of melting point 124–126° C. An additional recrystallization from methanol resulted in pure phenyl 4-N-methylcarbamyloxybenzhydryl ketone of melting point 126–127° C. and having an analysis as follows:

Analysis.—Calcd. for $C_{22}H_{19}NO_3$: C, 76.50; H, 5.53; N, 4.06. Found: C, 76.35; H, 5.57; N, 3.90.

EXAMPLE 2

Phenyl 4-N-ethylcarbamyloxybenzhydryl ketone

A mixture of 15 g. of phenyl 4-hydroxybenzhydryl ketone in 250 ml. of pyridine with 3.5 g. of ethyl isocyanate was allowed to stand at room temperature (23–26° C.) over a period of 4 days. The mixture thereafter was refrigerated, the precipitate collected on a filter, washed repeatedly with water and thereupon recrystallized four times from methanol to give pure phenyl 4-N-ethylcarbamyloxybenzhydryl ketone.

EXAMPLE 3

Phenyl 4-N-butylcarbamyloxybenzhydryl ketone

A mixture of 15 g. of phenyl 4-hydroxybenzhydryl ketone, 250 ml. of diisopropyl ether, 6.5 g. of butyl isocyanate, and 3 drops of triethylamine was heated under reflux for 6 hours and thereupon cooled in the refrigerator overnight. The mixture was then evaporated to dryness and the obtained materail recrystallized from chloroform-Skellysolve B hexanes and then from methanol to give phenyl 4-N-butylcarbamyloxybenzhydryl ketone.

EXAMPLE 4

Phenyl 4-N-hexylcarbamyloxybenzhydryl ketone

In the manner given in Example 2, phenyl 4-hydroxybenzhydryl ketone was reacted with hexyl isocyanate in pyridine solution at room temperature for 5 days. The mixture was then filtered and the obtained precipitate recrystallized from chloroform-Skellysolve B hexanes and methanol to give phenyl 4-N-hexylcarbamyloxybenzhydryl ketone.

Example 5

*Phenyl 2-N-methylcarbamyloxybenzhydryl ketone*

In the manner given in Example 1, phenyl 2-hydroxybenzhydryl ketone in toluene solution was reacted with methyl isocyanate in the presence of triethylamine. The mixture was allowed to reflux for 6 hours and was then concentrated to give a residue which was recrystallized from chloroform-Skellysolve B hexanes and from aqueous ethanol to give phenyl 2-N-methylcarbamyloxybenzhydryl ketone.

Example 6

*Phenyl 2-N-isopropylcarbamyloxybenzhydryl ketone*

In the manner given in Example 2, phenyl 2-hydroxybenzhydryl ketone in diisopropyl ether was reacted with isopropyl isocyanate in pyridine solution at 40° C. for a period of 36 hours. The material was then cooled and the cooled solution evaporated in vacuo to give a residue which was recrystallized from methylene chloride and Skellysolve B hexanes and thereafter from methanol to give phenyl 2-N-isopropylcarbamyloxybenzhydryl ketone.

Example 7

*Phenyl 2-N-pentylcarbamyloxybenzhydryl ketone*

In the manner given in Example 2, phenyl 2-hydroxybenzhydryl ketone was reacted with pentyl isocyanate in pyridine solution to give phenyl 2-N-pentylcarbamyloxybenzhydryl ketone.

Example 8

*Phenyl 2-N-2,3-dimethylbutylcarbamyloxybenzhydryl ketone*

A mixture of 15 g. of phenyl 2-hydroxybenzhydryl ketone, 250 ml. of toluene, 8 g. of 2,2-dimethylbutyl isocyanate, and 3 drops of triethylamine was heated overnight for 16 hours at reflux and thereupon evaporated under reduced pressure. The thus-obtained residue was recrystallized twice from chloroform-Skellysolve B hexanes and 3 times from methanol to give phenyl 2-N-2,3-dimethylbutylcarbamyloxybenzhydryl ketone.

Example 9

*Phenyl 3-N-methylcarbamyloxybenzhydryl ketone*

In the manner given in Example 1, phenyl 3-hydroxybenzhydryl ketone was reacted in toluene solution with methyl isocyanate and triethylamine. The mixture, after being heated for 6 hours, was evaporated in vacuo and the resulting material was recrystallized from chloroform-Skellysolve B hexanes and methanol to give phenyl 3-N-methylcarbamyloxybenzhydryl ketone.

Example 10

*Phenyl 3-N-ethylcarbamyloxybenzhydryl ketone*

In the manner given in Example 2, phenyl 3-hydroxybenzhdryl ketone in pyridine solution was reacted with ethyl isocyanate to give phenyl 3-N-ethylcarbamyloxybenzhydryl ketone.

Example 11

*Phenyl 3-N-butylcarbamyloxybenzhydryl ketone*

In the manner given in Example 2, phenyl 3-hydroxybenzhydryl ketone in pyridine solution was reacted with butyl isocyanate to give 3-N-butylcarbamyloxybenzhydryl ketone

Example 12

*Phenyl 3-N-2,2-dimethylbutylcarbamyloxy-benzhydryl ketone*

A mixture of 3 g. of phenyl 3-hydroxybenzhydryl ketone in pyridine solution was reacted with 1.5 g. of 2,2-dimethylbutyl isocyanate in pyridine solution at 40° C. for a period of 36 hours. The material was thereupon concentrated to half volume and refrigerated. The resulting precipitate was washed with water and thereupon recrystallized from methylene chloride and Skellysolve B hexanes and 3 times from aqueous methanol to give phenyl 3-N-2,2-dimethylbutylcarbamyloxybenzhydryl ketone

I claim:

1. A phenyl carbamyloxybenzhydryl ketone of the formula:

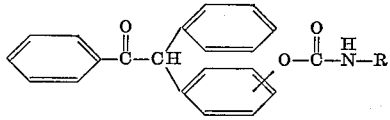

wherein R is a lower-alkyl radical having from 1 to 6 carbon atoms, inclusive.

2. Phenyl 4-N-methylcarbamyloxybenzhydryl ketone.
3. Phenyl 4-N-ethylcarbamyloxybenzhydryl ketone.
4. Phenyl 3-N-methylcarbamyloxybenzhydryl ketone.
5. Phenyl 2-N-methylcarbamyloxybenzhydryl ketone.

References Cited by the Examiner

UNITED STATES PATENTS 3,067,240   12/1962   Rosenberg _____ 260—482

LORRAINE A. WEINBERGER, *Primary Examiner.*

DENNIS P. CLARKE, ALBERT P. HALLUIN,
*Assistant Examiners.*